United States Patent

[11] 3,627,760

[72] Inventors Hans Bickel
Binningen;
Rolf Bosshardt, Arlesheim; Bruno Fechtig, Reinach; Enrico Menard, Basel; Johannes Mueller, Arlesheim; Heinrcih Peter, Riehen, all of Switzerland
[21] Appl. No. 784,213
[22] Filed Dec. 16, 1968
[45] Patented Dec. 14, 1971
[73] Assignee Ciba Corporation
Summit, N.J.
[32] Priority Sept. 13, 1968
[33] Switzerland
[31] 13750/68

[54] 7-(HETEROCYCLYLMERCAPTOACETYLAMINO)-CEPHALOSPORAMIC ACIDS
9 Claims, No Drawings

[52] U.S. Cl. .................................................. 260/243, 424/246
[51] Int. Cl. .................................................. C07d 99/24
[50] Field of Search ........................................... 260/243

[56] References Cited
UNITED STATES PATENTS
3,365,449   1/1968   Takano et al. ............... 260/243
3,360,515  12/1967   Takano et al. ............... 260/243 C
3,422,100   1/1969   Crast ........................... 260/243 C Primary Examiner—Nicholas S. Rizzo
Attorneys—Harry Goldsmith, Joseph G. Kolodny, Bryant W. Brennan and Edward J. Sites ABSTRACT: 7-(Heterocyclyl-mercaptoacetylamino)-cephalosporanic acids.
Use: antibiotics.

7-(HETEROCYCLYLMERCAPTOACETYLAMINO)-CEPHALOSPORAMIC ACIDS

The present invention is concerned with the manufacture of new, therapeutically active derivatives of 7-aminocephalosporanic acid of the formula

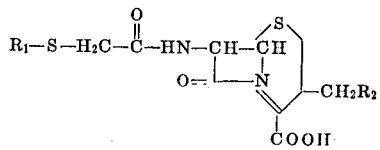

where $R_1$ represents a heterocyclyl residue containing at least two hetero atoms which is linked with the sulfur atom of the mercapto-acetyl group directly through a carbon atom located between two hetero atoms, and where $R_2$ stands for a free hydroxyl group or a hydroxyl group esterified by a carboxylic acid in which hydroxyl group ester oxygen atoms may be replaced by sulfur atoms, or is a possibly N-substituted carbamoyloxy group in which oxygen atoms may be replaced by sulfur, or a quaternary amino group, and if desired of their inner salts.

$R_1$ is more especially a monocyclic heterocyclyl residue, above all a 5- or 6-membered heterocyclyl residue which contains as hetero atoms nitrogen, oxygen or sulfur atoms. The ring is preferably at least partially unsaturated. Thus, $R_1$ may be, for example imidazolyl(2), imidazolinyl(2), oxazolyl(2), oxazolinyl(2), thiazolyl(2), thiazolinyl(2), 1,2,4-triazolyl(3), 1,3,4-dithiazolyl(2), 1,2,4-thiadiazolyl(3), pyrimidyl(2), 1,2,4-triazinyl(2), 1,3,5-triazinyl(2), 1,3-thiazinyl(2), 1,3,4-thiadiazinyl(2), 1,3,5-thiadiazinyl(4), 1,3,4-oxadiazinyl(2), 1,3,5-dioxazinyl(2). The residue may also be substituted, especially by lower alkyl, lower alkoxy, hydroxyl, mercapto groups or halogen such as iodine, bromine, fluorine or especially chlorine and/or it may contain a fused-on benzene ring, e.g., benzimidazolyl(2) or benzothiazolyl(2).

An esterified hydroxyl group $R_2$, in which oxygen atoms may be replaced by sulfur, is derived from a carboxylic acid and is preferably the acetoxy group or, for example a monocyclic or bicyclic arylcarbonyloxy or thiocarbonyloxy, arylcarbonylmercapto or thiocarbonylmercapto group which may be substituted by lower alkyl, lower alkoxy or lower alkylmercapto groups, halogen atoms or the nitro group; $R_2$ is especially the benzoylmercapto group. As further examples of $R_2$ there may be mentioned:

a. A carbamoyloxy group of the formula —O—CO—NH—$R_3$ where $R_3$ is an aliphatic, aromatic, araliphatic or heterocyclic residue, especially an unsubstituted or substituted (preferably by one or several lower alkoxy groups or halogen atoms) linear or branched lower alkyl radical such as the methyl, ethyl or especially the β-chlorethyl radical; or b. A thiocarbamoylmercapto group of the formula

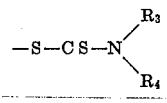

where $R_3$ has the above meaning and $R_4$ stands for hydrogen or is equal to $R_3$; or c. A quaternary amino group in which the quaternary nitrogen atom is, for example, part of an aromatic ring, such as a quinoline, isoquinoline or pyrimidine ring, especially of an unsubstituted or substituted pyridine ring, for example of the formula

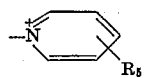

where $R_5$ represents hydrogen or one or several lower alkyl, lower alkoxycarbonyl, carbamoyl or carboxyl groups or one or several halogen atoms.

The salts of the new compounds are metal salts, above all salts of therapeutically acceptable alkali or alkaline earth metals, such as sodium, potassium, calcium or ammonium or salts with organic bases, for example triethylamine, N-ethylpiperidine, dibenzylethylenediamine or procain. When the group $R_2$ is basic, inner salts may be formed.

The new compounds display a particularly good antibacterial activity. They act both against Gram-positive and above all also Gram-negative bacteria, for example against *Staphylococcus aureus* penicillin-resistant, *Escherichia coli*, *Klebsiella pneumonia*, *Salmonella typhosa* and *Bacterium proteus*, as can be shown also in animal tests, for example on mice. They may therefore be used for combating infections caused by such micro-organisms, furthermore as additives to animal fodder, for preserving victuals or as disinfectants. Particularly valuable are compounds in which $R_1$ is imidazolyl(2), imidazolinyl(2), thiazolyl(2), thiazolinyl(2), or triazolyl(2) and $R_2$ represents the acetoxy group, the β-chlorethylcarbamoyl or an unsubstituted pyridinio group or one substituted as indicated above.

The new compounds are obtained when a. a compound of the formula

II 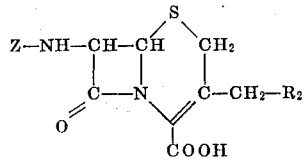

where Z represents a halogenacetyl radical such as fluoracetyl, chloracetyl, iodoacetyl or above all bromacetyl and $R_2$ has the above meaning—is reacted with a mercapto compound of the formula $R_1$—SH, where $R_1$ has the above meaning; or b. a compound of the formula II, in which Z stands for hydrogen, is acylated by the group $R_1$—S—$CH_2$—O and, if desired, resulting compounds, containing a hydroxyl group $R_2$ which may be free or esterified with a carboxylic acid are converted one into the other and, if desired, in resulting compound which $R_2$ is a hydroxyl group esterified by a carboxylic acid, in which group oxygen atoms may be replaced by sulfur atoms, this group is replaced in known manner by a possibly N-substituted carbamoyloxy group (in which oxygen atoms may be replaced by sulfur atoms) or by a quaternary amino group and possibly, if desired, the resulting compounds are converted into their metal salts, such as alkali or alkaline earth metal salts, or salts with ammonia or with organic bases, or from resulting salts the free carboxylic acids are liberated or if desired inner salts are formed.

The reaction of the compound II, where Z represents a halogenacetyl group, with the mercapto compound is preferably carried out in an inert solvent for the compound, such as methylenechloride, chloroform, carbon tetrachloride, tetrahydrofuran, dioxane, dimethylformamide or acetonitrile, and in the presence of a hydrogen halide acceptor, for example a weak inorganic base such as a carbonate, bicarbonate or acetate of an alkali metal or of a tertiary amine, preferably ethyldiisopropylamine (Huenig's base). At room temperature the reaction is complete within a few hours; if desired, it can also be carried out with cooling or at a slightly elevated temperature.

The compound II, where Z is hydrogen, is acylated in the manner known for acylating aminoacids, for example with the aid of an acid halide, especially acid chloride, or acid azide or an acid anhydride, especially a mixed anhydride, for example a mixed anhydride formed with monoesterified carbonic acid, pivalic acid or trichloracetic acid, or with the free acid itself, in the presence of a condensing agent such as a carbodiimide, for example dicyclohexyl carbodiimide. An alternative manner of acylating compound II consists in first silyizing or stannylizing a compound II in which Z represents hydrogen, and then acylating the product with the acid or a reactive acid derivative containing the $R_1$—S—$CH_2$—CO—group and splitting off any silyl or stannyl groups present by means of alcohol or water; cf. for example British Pat. No. 1,073,530, and Dutch Pat. application No. 67.17107.

Preferred starting materials are those which give rise to the particularly active final products mentioned above.

The cephalosporin derivatives used as starting materials are known or can be manufactured by known processes.

The new compounds may be used as medicaments, for example in the form of pharmaceutical preparations containing the new compounds in conjunction or admixture with a pharmaceutical organic or inorganic, solid or liquid excipient suitable for internal, local or parenteral administration. Suitable excipients are substances that do not react with the new compounds, for example, water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain other therapeutically valuable substances. The preparations are formulated in the usual manner.

The following examples illustrate the invention.

7-Aminocephalosporanic acid is hereinafter referred to by the abbreviated form 7–ACA.

For the thin-layer chromatography on silica gel plates the following systems were used:

System 52: n-butanol+glacial acetic acid+water (75:7.5:21)
System 101A: n-butanol+pyridine+glacial acetic acid+water (42:24:4:30)

In the examples, "MIC" means the minimum inhibitory concentration which is measured by the gradient plate test described in "Antibiotics" Vol. 1 by Gottlieb and Shaw, New York 1967, page 508. The MIC is determined on strains of *Staphylococcus aureus* SG 511 (sensitive to penicillin) or Staphylococcus aureus 2,999 (resistant to penicillin), *Bacillus subtilis*, *Bacillus megatherium*, *Escherichia coli* 2,018, *Klebsiella pneumonia* and/or *Salmonella typhimuri*.

EXAMPLE 1

3.93 grams (10 mols) of bromacetyl-7–ACA are dissolved in 20 ml. of methylenechloride with addition of 3.45 ml. (20 mmols) of N-ethyldiisopropylamine. A solution of 1.37 g. (12 mmols) of 2-mercapto-1-methylimidazole in 20 ml. of 2-mercapto-1-methylimidazole in 20 ml. of methylenechloride is then added; flushing is performed with 10 ml. of methylenechloride.

After 7 hours, the solvent is expelled under vacuum and the resulting oil mixed with 10 ml. of methanol and 1.65 ml. of glacial acetic acid, whereupon after a short time the product crystallizes out almost completely; it is suctioned off, rinsed with methanol, and dried to yield practically pure 7-[1-methyl-imidazolyl-(2)-mercaptoacetylamino] cephalosporanic acid melting at 177° to 179° C. with decomposition (in an evacuated capillary).

The substance is converted as follows into its crystalline sodium salt: 2.9 grams are suspended in 60 ml. of methanol and 3.75 ml. of 3-molar methanolic sodium-α-ethylhexanoate are added. On stirring and heating for a short time in a water bath at 30° C., temporary solution occurs and then the sodium salt crystallizes out. The mixture is evaporated under vacuum to about 15 ml. left to itself for 1 hour at −20° C., suctioned, and the residue is washed with a 1:1-mixture of tetrahydrofuran and methanol and dried under vacuum. The sodium salt is readily soluble in water and has an optical rotation $[\alpha]_D^{20}=+107°\pm1°(c=1,$ water). The ultraviolet spectrum in water reveals a maximum at $\lambda=256$ $\mu(\epsilon=12,800)$. Melting point: 150°–154° C. with decomposition. $Rf_{52}=0.04$; $Rf_{101A}=0.35$ MIC: *St. aureus* SG 511 = 0.35 γ/ml.; *Bac. subt.* = 0.2 γ/ml.; *E. coli* 2,018=20 γ/ml.; *Kl. pneum.* = 4 γ/ml.; *Salm. typh.* = 20 γ/ml.

EXAMPLE 2

3.93 grams (10 mmols) of bromacetyl-7–ACA are dissolved in 15 ml. of methylenechloride with addition of 3.45 ml. (20 mmols) of N,N-diisopropylethylamine, and a solution of 1.23 g. (12 mmols) of 2-mercaptoimidazoline in 20 ml. of dimethylformamide, diluted with 10 ml. of methylenechloride, is added. Flushing is performed with 5 ml. of methylenechloride.

After 6 hours the methylenechloride is distilled off under a water-jet vacuum, and then the dimethylformamide is distilled off as completely as possible under a vacuum of about 0.3 mm. and at a temperature of 30° C., to yield 10.7 g. of a thick oil. On addition of 100 ml. of tetrahydrofuran a precipitate is obtained which is intensively kneaded, filtered and the residue is triturated with another 50 ml. of tetrahydrofuran, suctioned, and rinsed with a small quantity of tetrahydrofuran and then with hexane. After drying under vacuum there are obtained 6.75 g. of a yellowish powder.

A solution of 4.5 g. of the above crude product in 13.5 ml. of dimethylformamide is diluted with 13.5 ml. of methanol. The solution is agitated with a pinch of Norite (active carbon) for 5 minutes at room temperature, then filtered through a layer of Hyflo Supercel (diatomaceous earth), and the filter is rinsed with 6 ml. of a mixture of dimethylformamide and methanol 1:1. The filtrate and the washings are combined and mixed with 165 ml. of tetrahydrofuran, whereupon a light-yellow precipitate forms which is kept for 1 hour at −20° C., then suctioned and the residue is thoroughly washed with a 1:4.5-mixture of methanol and tetrahydrofuran, with tetrahydrofuran and finally with hexane. After drying, 7-[imidazolinyl-(2(-mercaptoacetylamino]-cephalosporanic acid is obtained as an almost colorless, amorphous powder which is unitary according to its thin-layer chromatogram. $Rf_{52}=0.05$; $Rf_{101A}=0.25$. Melting point (in an evacuated capillary): 213° to 216° C. with decomposition; the optical rotation $[\alpha]_D^{20}=+143°\pm2°(c=0.5,$ water). MIC: *St. aureus* SG511=1.5 γ/ml. *Bac. subt.*=0.2 γ/ml.; *Bac. megath.*=35 γ/ml.; *E. coli* 2,018=30 γ/ml.; *Kl. pneum.*=15 γ/ml.; *Salm. typh.*=20 γ/ml.

EXAMPLE 3

3.93 grams of bromacetyl-7–ACA are dissolved in 27 ml. of methylenechloride with addition of 3.45 ml. of N,N-diisopropylethylamine. Then a solution is added obtained by dissolving 1.43 g. of 2-mercaptothiazoline in 2 ml. of dimethylformamide and dilution with 8 ml. of methylenechloride. Flushing is performed with 10 ml. of methylenechloride.

After 7 hours, the solvent is expelled, first under a water-jet vacuum and then on a waterbath of 30° C. under a vacuum of about 0.3 mm. Hg., to yield of 7 g. of a thickly liquid oil.

6.3 grams of the above crude product are taken up in 27 ml. of 10 percent of potassium dihydrophosphate solution. The pH value is adjusted to 5 with 0.3 ml. of 2N-sodium carbonate solution. The solution is then poured into a separating funnel and extracted with 55 ml. of methylenechloride and then with 90 ml. of ethyl acetate. The organic phases are washed with 2×45 ml. of phosphate buffer of pH 5 and discarded. All aqueous phases are then combined and converted with 180 ml. of ethyl acetate, and the pH value is adjusted to 2.9 with 11 ml. of N-hydrochloric acid, and the aqueous phase is saturated with sodium chloride. The whole is throughly agitated, the phases are separated and the aqueous phase is further extracted with 2×90 ml. of ethyl acetate. The organic phases are successively washed with 45 ml. of saturates sodium chloride solution, dried with sodium sulfate, combined and evaporated to dryness under vacuum. The amorphous residue crystallizes almost completely on addition of 6 ml. of a 9:1-mixture of ethyl acetate and tetrahydrofuran. The crystals (1.76 g) are suctioned off and washed with ethyl acetate. For purification they are dissolved in 15 ml. of tetrahydrofuran, agitated with a pinch of Norite at room temperature, filtered through a layer of Hyflo Supercel, the filter is rinsed with 5 ml. of tetrahydrofuran, the solvent is expelled under vacuum, and the amorphous residue is crystallized from 5 ml. of a 9:1-mixture of ethyl acetate and tetrahydrofuran. The crystals are suctioned off, washed with ethyl acetate and dried under a high vacuum, to yield pure 7-[thiazolinyl-(2)-mercaptoacetylamino]-cephalosporanic acid melting (in an evacuated capillary) at 131° to 138° C. with decomposition. To manufacture the sodium salt 1.6 g. of the acid are suspended in 32 ml. of methanol and 2.1 ml. of 3-molar methanolic sodium ethylhexanoate are added. The resulting solution is concentrated under vacuum to a volume of 8 to 10 ml. and kept for about 2½ hours at −20° C., then suctioned and the crystals of the sodium salt are washed successively with 12 ml. of a 1:1-mixture of methanol and ethyl acetate, with 5 ml. of ethyl acetate and with hexane. The sodium salt melts at 185° to 189° C. with decomposition. Optical rotation $[\alpha]_D^{20} = +120° \pm 1°$ (c=1, water). $Rf_{52}=0.26$; $Rf_{101A}=0.55$. MIC: St. aureus SG 511=0.1 γ/ml. Bac. subt.=0.1 γ/ml., Bac. megath.=65 γ/ml.; E. coli 2,018=25 γ/ml.; Kl. pneum.=20 γ/ml.; Salm. typh.=25 γ/ml.

EXAMPLE 4

A solution of 3.93 g. of bromacetyl-7—ACA and 3.45 ml. of diisopropylethylamine in 20 ml. of methylenechloride is mixed with a solution obtained by dissolving 1.22 g. of 3-mercapto-1,2,4-triazole in 10 ml. of dimethylformamide and dilution with 10 ml. of methylenechloride. Flushing is performed with 10 ml. of methylenechloride.

After 7 hours the solvent is distilled off, first under a waterjet vacuum and then on a waterbath (30°–40° C.) under about 0.2 mm. Hg, whereupon 10.5 g. of a brownish oil are obtained, and this crude product is taken up in 20 ml. of a 10 percent potassium dihydrogenphosphate solution. The pH value is adjusted to 5 with 0.9 ml. of 2N-sodium carbonate solution. The solution is extracted in a separating funnel with 80 ml. of methylenechloride and then with 30 ml. of ethyl acetate. The organic phases are washed with 2×20 ml. of phosphate buffer of pH 5. The combined aqueous phases are then covered with 300 ml. of ethyl acetate and the pH value is adjusted to 2.9 with 1.0 ml. of concentrated hydrochloric acid, whereupon a colorless precipitate is formed which fills the two phases. The whole contents of the separating funnel is suctioned off through a glass filter and the residue washed with 100 ml. of ethyl acetate. By repeated trituration of this precipitate with tetrahydrofuran (about 150 ml.) the substantially pure and crystalline 7-[1,2,4-triazolyl-(3)-mercaptoacetylamino]-cephalosporanic acid can be dissolved out. The filtrate containing the two phases is separated and more crude crystallizate is isolated from it.

2.5 grams of the combined crude cyrstallizate are dissolved in 30 ml. of a 1:1 -mixture of tetrahydrofuran and methanol, agitated for a short time with a pinch of Norite at room temperature, filtered through a layer of Hyflo Supercel, and the filter is rinsed with 3 ml. of the above mixture and with 5 ml. of methanol. The filtrate is then concentrated under vacuum to about 5 ml. after having been seeded, it crystallizes immediately. Melting point: 149° to 151°C. with decomposition.

1.55 grams of the acid are suspended in 50 ml. of methanol and 1.85 ml. of 3-molar methanolic sodium ethylhexanoate are added. The clear solution is concentrated under vacuum to about 10 to 12 ml., whereupon crystals form slowly. Then 2.5 ml. of tetrahydrofuran are added and the mixture is kept for 2 hours at −20° C., suctioned, and the residue is successively washed with 1:1-methanol+tetrahydrofuran, tetrahydrofuran, ethyl acetate and hexane.

Optical rotation of the pure sodium salt $[\alpha]_D^{20}=+113° \pm 1°$. Melting point: 220°=230° C. with decomposition. $RF_{52}=0.21$; $Rf_{101A}=0.5$. MIC: St. aureus SG 511=1.5 γ/ml.; Bac. subt.=0.45 γ/ml.; E. coli 2,018=25 γ/ml.; Kl. pneum.= 4.5 γ/ml.; Salm. typh.=4.5 γ/ml.

EXAMPLE 5

A solution of 39.3 mg. of bromacetyl-7—ACA in 0.2 ml. of methylenechloride is mixed with 25.8 mg. of N,N-diisopropylethylamine and then a solution is added obtained by dissolving 17.4 mg. of 2-mercapto-4,5-dimethylthiazole in 0.05 ml. of dimethylformamide and dilution with 0.15 ml. of methylenechloride. Flushing is performed with 0.05 ml. of methylenechloride.

After 7 hours the solvent is expelled under 0.3 mm. Hg on a waterbath at 30° C., and the resulting oil is worked up as described in example 3, to yield 7-[4,5-dimethyl-thiazolyl-(2)-mercaptoacetylamino]-cephalosporanic acid. $Rf_{52}=0.35$; $Rf_{101A}=<\sim0.6$.

EXAMPLE 6

0.393 gram (1.0 mmol) of bromacetyl-7-ACA is dissolved in 2.0 ml. of methylenechloride with addition of 258 mg. of N,N-diisporpylethylamine, and a solution is added which has been obtained by dissolution of 180 mg. of 2,5-dimercapto-1,3,4-thiadiazole in 0.5 ml. of dimethylformamide and dilution with 2.2 ml. of methylenechloride. For flushing 1 ml. of methylenechloride is used.

After 6 hours the solvent is distilled off, first under a waterjet vacuum and then on a waterbath (30° C.) under about 0.2 mm. Hg, to leave about 1.1 g. of a yellowish oil. This crude product is taken up in 10 ml. of a 10 percent potassium dihydrogenphosphate solution, and the pH value is adjusted to 5 with 0.3 ml. of 2N-sodium carbonate solution. The whole is extracted in a separating funnel with 20 ml. of methylenechloride and then with 30 ml. of ethyl acetate. The organic phases are washed with 2×10 ml. of phosphate buffer of pH 5. Then the aqueous phases are combined and covered with 40 ml. of ethyl acetate. The pH value is adjusted to 2.9 by means of 2.7 ml. of N-hydrochloric acid, and the aqueous phase is saturated with sodium chloride. The whole is vigorously agitated, then the phases are separated, and the aqueous solution is further extracted with 2×20 ml. of ethyl acetate. The three organic phases are washed successively with 8 ml. of saturated sodium chloride solution, dried with sodium sulfate, filtered and evaporated to dryness under vacuum. The residue crystallizes from a 9:1-mixture of ethyl acetate and tetrahydrofuran.

7-[5-Mercapto-1,3,4-thiadiazolyl-(2)-mercaptoacetylamino]-cephalosporanic acid melts at 130° to 142° C. with decomposition (evacuated capillary.). $Rf_{52}=0.36$; $Rf_{101A}=0.6$.

EXAMPLE 7

1.97 grams of bromacetyl-7-7 are dissolved in 5 ml. of methylenechloride with addition of 1.29 g. (10 mmols) of N,N-diisopropylethylamine, and then a solution is added which has been prepared by dissolution of 0.975 g. of 2-mercaptobenzimidazole in 5 ml. of dimethylformamide and dilution with 10 ml. of methylenechloride. For flushing 5 ml. of methylenechloride are used.

After 5 hours the solvent is distilled off, first under a waterjet vacuum and then under about 0.2 mm. Hg (waterbath 30° C.). The resulting light-brown oil is taken up in 10 ml. of a 10 percent potassium dihydrogenphosphate solution, and the pH value is adjusted to 5 by means of 0.5 ml. of 2N-sodium carbonate solution. The whole is then extracted in a separating funnel with 2×100 ml. of ethyl acetate, and the extracts are washed with 2×5 ml. of phosphate buffer of pH 5. The aqueous phases are combined, covered with 250 ml. of ethyl acetate and the pH is adjusted to 2.5 with 9 ml. of N-hydrochloric acid, whereupon a resinous precipitate forms which consists substantially of the desired product; it is separated and kneaded with hexane, and from the resulting solid residue 7-[benzimidazolyl-(2)-mercaptoacetylamino]-cephalosporanic acid is extracted with tetrahydrofuran. The two-phase filtrate obtained after isolation of the precipitate is saturated with sodium chloride. The whole is vigorously agitated and the organic phase is separated, and the aqueous phase is once more extracted with 2×100 ml. of ethyl acetate. The three aqueous phases are washed successively with 10 ml. of saturated sodium chloride solution, dried with sodium sulfate, filtered and the combined organic solutions are concentrated under vacuum to a volume of about 10 ml. whereupon the bulk of 7-[benzimidazolyl-(2)-mercaptoacetylamino]-cephalosporanic acid crystallizes; it melts at 135° to 145° C. with decomposition. $Rf_{52}=0.35$; $Rf_{101A}=0.6$. MIC: *St. aureus* SG 511=0.3 γ/ml.; *St. aureus* 2,999=2.5 γ/ml.; *Bac. subt.*=0.06 γ/ml.; *Bac. megath.*=45 γ/ml.; *E. coli* =40 γ/ml.

EXAMPLE 8

11.75 g. of 3-(desacetoxymethyl)-3benzoylthiomethyl- 7-bromoacetylamino-cephalosporanic and 8.75 ml. of N-ethyldiisopropylamine are dissolved in 75 ml. of dimethylformamide. A solution of 3.58 g. of 2-mercaptothiazoline in 25 ml. of dimethylformamide is added, and the whole allowed to stand at room temperature in the dark. After 20 hours the greater part of the solvent is distilled off under a pressure of 0.5–1mm. Hg and the resulting oily residue dissolved in 250 ml. of phosphate buffer at pH 6 and in 250 ml. of ethyl acetate. The pH of the aqueous phase is then adjusted to 6, and the phases are separated. The organic phase is discarded. The aqueous phase is given a pH of 2.3 with hydrochloric acid, then saturated with sodium chloride. There follows extraction with 1,000, 250 and 250 ml. of ethyl acetate. The ethyl acetate extracts are washed with saturated sodium chloride solution, dried with sodium sulfate, and filtered through a column of 75 g. of silica gel. The filtrates are combined and yield a dry residue of 11 g. This residue is chromatographed through a column of 520 g. of silica gel with chloroform and chloroform+acetone mixtures. The chloroform+acetone (9:1) eluates yield 7.6 g. of amorphous 3-(desacetoxymethyl)-3-benzoyl thiomethyl-7-[thiazolinyl(2)-mercaptoacetylamino]-cephalosporanic acid which, by means of sodiun-α-ethylhexanoate, can be converted into the crystalline sodium salt of the formula

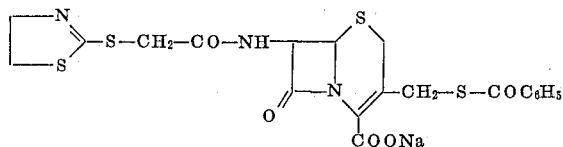

$Rf_{52}=0.50$. UV spectrum in water, maxima at λ=240 nm (ϵ=19,200) and λ=274nm (λ=20,000).

The 3-(desacetoxy-methyl)-3-benzoylthiomethyl-7-bromoacetylaminocephalosporanic acid, used as starting material can be prepared as follows:

A solution of 17.5 g. of 3-(desacetoxymethyl)-3-benzoylthiomethyl)-7-amino-cephalosporanic acid (cf. Belgian Pat. No. 650,,444) and 12.5 ml. of triethylamine in 1 liter of dimethylformamide is added dropwise in the course of 1 hour at −13° to −15° C. to a well-stirred solution of 9.2 ml. of bromoacetylbromide in 100 ml. of methylene chloride (in an atmosphere of nitrogen). The temperature is allowed to rise slowly to 10° C. and is kept at that level for half an hour. The greater part of the solvent is then distilled off under a pressure of 0.5–1 mm. Hg with the aid of a condenser filled with dry ice and acetone.

The oily product is poured on a phosphate buffer of pH 6, and the whole agitated with 1 liter of ethyl acetate. At the borderline between the two phases a precipitate forms which is separated by filtration or centrifuging. The pH of the aqueous phase is then adjusted to 2, which operation is followed by saturation with sodium chloride and separation of the two phases. The aqueous phase is further extracted with 600 and then 400 ml. of ethyl acetate. The organic phases are washed with saturated sodium chloride solution and dried over sodium solfate, then filtered successively through a column of 100 ml. of silica gel. The filtrates are concentrated to dryness under vacuum, the residue treated with 30 ml. of ethanol, and crystallized at −20° C. There are obtained 7.8 g. of 3-(desacetoxymethyl)-3-benzoylthiomethyl-7-bromoacetylamino-cephalosporanic acid melting at 137°–138° C. $Rf 52=0.55$. The sodium salt exhibits in the U.V. spectrum in water:

λmax 243 nm (ϵ=16,800) and 275nm (ϵ=20,600).

$[\alpha]_D^{20}=-47\pm1°$ (c=1; in 0.1 mol sodium bicarbonate+acetone (1:1)). MIC: *St. aureus* SG 511=0.04 γ/ml. *Staph. aureus* 2,999=15 γ/ml.; *Bac. subt.*=0.03 γ/ml.; *Kl. pneum.*=45 γ/ml.; *Salm. typh.*=40 γ/ml.

EXAMPLE 9

A solution of 4.73 g. of 3-(desacetoxymethyl)-3-benzoylthiomethyl-7-[thiazolinyl(2)-mercaptoacetylamino]-cephalosporanic acid (sodium salt) in 35 ml. of pyridine is diluted with 35 ml. of dioxan. 20.9 ml. of a 40 percent mercury perchlorate solution are then added and the whole allowed to react at 45° C. for 45 minutes while stirring vigorously (under an atmosphere of nitrogen). The batch is cooled, treated with 11.1 ml. of thiobenzoic acid, and agitated for 5 minutes. The solvents are distilled off, and a solution of the residue in 140 ml. of water is filtered through "Celite." The filtrate is washed successively with 90 ml. of toluene, 2×55 ml. of "Amberlite" LA-2 in 115 ml. of toluene, and 2×90 ml. of toluene. The aqueous phase is then filtered through a column consisting (upwards) of 8.5 ml. of "Sephadex" CM C-25 (H+ form), 34 ml. of "Alox," 8.5 ml. of "Zeo-Karb" 226 (H+ form), 34 ml. of "Alox," 8.5 ml. of "Dowex-1" (acetate form) and 8.5 ml. of "Sephadex" CM C-25 (H+ form). The "-Celite," the organic phases, and the column are further extracted with 2×30 ml. of water, and in addition, the column is eluted with another 200 ml. of water. The eluates are combined and concentrated under reduced pressure, a small amount of precipitate is removed by filtration, and the batch evaporated to dryness. The residue is triturated with 10 ml. of alcohol and yields pure 3-(desacetoxymethyl)-3-pyridiniomethyl-7-[thiazolinyl(2)-mercaptoacethylamino]-cephalosporanic acid. $[\alpha]_D^{20}=+41°\pm1°$ (c=1 in water); U.V. spectrum in water: λmax =257 nm (ϵ=13,000). $Rf101A=0.18$. MIC: *Staph. aureus* SG 511=0.03 γ/ml.; *Bac. subt.*=0.2 γ/ml.; *E. coli* 2,018=15 γ/ml.; *Kl. pneum.*=20 γ/ml.; *Salm. typh.*=15 γ/ml.

EXAMPLE 10

2.95 grams of the sodium salt of 7-[thiazolinyl(2)-mercaptoacetylamino]-cephalosporanic acid (cf. example 3) are dissolved in 150 ml. of water. The solution is heated to 37° C. and given a pH of 7.5 by means of 0.7 ml. of 0.1N-sodium hydroxide solution. A suspension of 60 mg. of acetyl esterase (from *Bacillus subtilis* ATCC 6,633, cf. British Pat. No. 1,080,904) in 2 ml. of water is then added and the acetic acid which forms is currently neutralized with the aid of an automatic titrator using 0.1N-sodium hydroxide solution (adjustment to pH 7.3). The reaction is complete after 4 hours. The pH is then adjusted to 6.5; the solution filtered through a glass frit G4and lyophilized. There are obtained 3.18 g. of a yellowish resin of the sodium salt of 7-[thiazolinyl(2)-mercaptoacetylamino]-0-desacetyl-cephalosporanic acid.

This crude product is dissolved as it is in a mixture of 30 ml. of absolute dimethylformamide an 8.4 ml. of triethylamine, the mixture treated with 5.05 ml. of β-chlorethylisocyanate and the whole stirred at room temperature for half an hour. The solvent is then expelled under a high vacuum, and the resinous, brown residue is triturated with 3×150 ml. of absolute ether. The ether-insoluble residue is dissolved in 75 ml. of 10 percent phosphorus buffer having a pH of 6.7 and covered with 500 ml. of ethyl acetate. After the addition of 30 ml. of 2N-hydrochloric acid the pH of the aqueous phase is adjusted to 2.5. The batch is vigorously agitated and the phases then separated and the aqueous phase extracted again with 300 and 200 ml. of ethyl acetate. The organic phases are washed twice with 50 ml. of saturated sodium chloride solution each time, dried with sodium sulfate, and evaporated to dryness under reduced pressure. On addition of a small quantity of acetone, the resulting resin crystallizes. The crystals are filtered with suction and washed with a mixture of equal parts of acetone and ether. The crude crystallizate can be further purified by adding to its suspension in 18 ml. of methanol 1.2 ml. of a 3-M.methanolic solution of sodium-α-ethylhexanoate, clarifying the mixture by means of "Hyflo" (diatomaceous earth), concentrating it under reduced pressure to about 8 ml., and crystallizing out at −15° C. the pure sodium salt of 0-desacetyl-0-(β-chlorethylcarbamoyl)-7-[thiazohinyl( 2)-mercaptoacetylamino]-cephalosporanic acid. In the ultraviolet spectrum, it has a $\lambda_{max}$ at 255 nm with $\epsilon$=10,850 (in water). Optical rotation $[\alpha]_D^{20}$=+99°±1°. In the thin layer chromatogram it has the following values:

for system 52=0.35 for system 101A=0.55, and in the system ethyl acetate:pyridine:glacial acetic acid:water (62:21:6:11) $Rf$=0.34.

We claim:

1. A compound of the formula

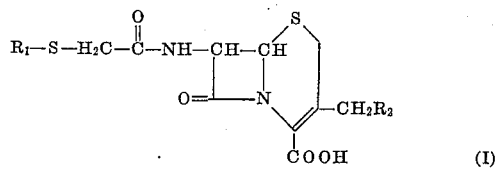

wherein $R_1$ represents monocyclic, 5-membered heterocyclyl which contains nitrogen or sulfur atoms as the hetero atoms and is unsubstituted or mercapto-substituted in 5-position and unsubstituted or substituted by one or more lower alkyl or lower alkoxy groups or hydroxyl groups in the other positions, and wherein said heterocyclyl contains at least two hetero atoms and is linked with the sulfur atom of the mercapto-acetyl group directly through a carbon atom located between two hetero atoms, and where $R_2$ stands for a member selected from the group consisting of hydroxy, acetoxy, phenylcarbonyloxy, phenylcarbonylthio, and the latter two substituted by lower aklyl, lower alkoxy, lower alkylmercapto, halogen, nitro; lower alkylcarbamoyloxy, halogen-substituted lower alkylcarbamoyloxy, or a pyridino group, or a therapeutically acceptable salt thereof.

2. A compound of the formula I as claimed in claim 1, in which $R_1$ represents monocyclic, 5-membered heterocyclyl which contains nitrogen, or sulfur atoms as the hetero atoms and is unsubstituted or mercapto-substituted in 5-position and unsubstituted or substituted by one or more lower alkyl or lower alkoxy groups or hydroxyl groups in the other positions, and wherein said heterocyclyl contains at least two hetero atoms, and $R_2$ stands for the acetoxy group, or a therapeutically acceptable salt thereof.

3. A compound of the formula I as claimed in claim 1, in which $R_1$ represents monocyclic, 5-membered heterocyclyl which contains nitrogen, or sulfur atoms as the hetero atoms and is unsubstituted or mercapto-substituted in 5-position and unsubstituted or substituted by one or more lower alkyl or lower alkoxy groups or hydroxyl groups in the other positions, and wherein said heterocyclyl contains at least two hetero atoms and $R_2$ stands for a pyridinio group, which forms an inner salt with the carboxyl group.

4. A compound of the formula I claimed in claim 1, in which $R_1$ represents monocyclic, 5-membered heterocyclyl which contains nitrogen, or sulfur atoms as the hetero atoms and is unsubstituted or mercapto-substituted in 5-position and unsubstituted or substituted by one or more lower alkyl or lower alkoxy groups or hydroxyl groups in the other positions, and wherein said heterocyclyl contains at least two hetero atoms and $R_2$ stands for a lower alkylcarbamoyloxy group, or a therapeutically acceptable salt thereof.

5. A compound of the formula I as claimed in claim 1, in which $R_1$ represents monocyclic, 5-membered heterocyclyl which contains nitrogen, or sulfur atoms as the hetero atoms and is unsubstituted or mercapto-substituted in 5-position and unsubstituted or substituted by one or more lower alkyl or lower alkoxy groups or hydroxyl groups in the other positions, and wherein said heterocyclyl contains at least two hetero atoms, and $R_2$ stands for a carbamoyloxy group of the formula in which $R_3$ represents a lower alkyl radical substituted by one or more lower alkoxy groups or halogen atoms, or a therapeutically acceptable salt thereof.

6. A compound of the formula I as claimed in claim 1, in which $R_1$ represents monocyclic, 5-membered heterocyclyl which contains nitrogen, or sulfur atoms as the hetero atoms and is unsubstituted or mercapto-substituted in 5-position and unsubstituted or substituted by one or more lower alkyl or lower alkoxy groups or hydroxyl groups in the other positions, and wherein said heterocyclyl contains at least two hetero atoms and $R_2$ stands for the β-chlorethyl-carbamoyloxy group, or a therapeutically acceptable salt thereof.

7. A compound of the formula I as claimed in claim 1, wherein $R_1$ represents the imidazolyl-(2), imidazolinyl)2), thizolyl(2), thiazolinyl(2)- or triazolyl(2) group, and $R_3$ stands for the acetoxy, β-chlorethylcarbamoxloxy or pyridinio group, or a therapeutically acceptable salt thereof.

8. A compound of the formula I as claimed in claim 1, in which $R_1$ represents 1-methyl-imidazolyl(2) and $R_2$ represents the acetoxy, pyridinio or β-chlorethylcarbomoyloxy group, or an salt thereof.

9. A compound of the formula I as claimed in claim 1, in which $R_1$ represents thiazolinyl(2and $R_2$ represents the acetoxy, pyridinio or β-chlorethylcarbomoyloxy group, or an salt thereof.

* * * * *

CASE 6347/1-3

PO-1050
(5/69)

UNITED STATES PATENT OFFICE
CERTIFICATE OF CORRECTION

Patent No. 3,627,760      Dated December 14, 1971

Inventor(s) Hans Bickel et al

It is certified that error appears in the above-identified patent and that said Letters Patent are hereby corrected as shown below:

In the title, change "CEPHALOSPORAMIC" to -- CEPHALOSPORANIC --.

Column 10, between lines 32 and 35 insert the formula $-CO-NH-R_3$                          ;

line 50, delete "thizolyl" and substitute -- thiazolyl --; line 51, delete "chlorethylcarbamoxloxy" and substitute -- chlorethylcarbamoyloxy --; lines 56 and 60, in each before "salt" insert -- (inner) --.

Signed and sealed this 19th day of September 1972.

(SEAL)
Attest:

EDWARD M. FLETCHER, JR.
Attesting Officer

ROBERT GOTTSCHALK
Commissioner of Patents